United States Patent
Shiraishi et al.

[11] Patent Number: 6,145,769
[45] Date of Patent: Nov. 14, 2000

[54] TAPE WINDING DEVICES

[75] Inventors: Yasushi Shiraishi; Yoshiaki Mochizuki, both of Tokyo, Japan

[73] Assignee: Casio Computer Co., Ltd., Tokyo, Japan

[21] Appl. No.: 09/051,838

[22] PCT Filed: Aug. 25, 1997

[86] PCT No.: PCT/JP97/02939

§ 371 Date: Apr. 22, 1998

§ 102(e) Date: Apr. 22, 1998

[87] PCT Pub. No.: WO98/08764

PCT Pub. Date: Mar. 5, 1998

[30] Foreign Application Priority Data

Aug. 27, 1996 [JP] Japan ................................ 8-224759
Sep. 12, 1996 [JP] Japan ................................ 8-241535

[51] Int. Cl.$^7$ ............................. G03B 1/04; G11B 15/32; B41J 33/14
[52] U.S. Cl. ..................... 242/340; 242/356.5; 242/336; 400/236
[58] Field of Search .................... 242/340, 336, 242/356.5, 389, 390; 400/236, 236.1

[56] References Cited

U.S. PATENT DOCUMENTS 4,015,792  4/1977  Thenon et al. .
4,611,937  9/1986  Sato et al. ..................... 400/236 X
4,917,328  4/1990  Kobayashi et al. ................ 242/204

FOREIGN PATENT DOCUMENTS

2 307 325  11/1976  France .
31 20 827   4/1982  Germany .
1112899    5/1968  United Kingdom .

Primary Examiner—John Q. Nguyen
Attorney, Agent, or Firm—Frishauf, Holtz, Goodman, Langer & Chick, P.C.

[57] ABSTRACT

A thin ribbon cassette (16) is a set on a tape winding device and its vertical-direction position is fixed by a position restricting member (18) provided on a back of a cover and for an apparatus body. When the ribbon cassette (16) is thin in correspondence to a narrow width of an ink ribbon (15), a quantity of lowerig a ribbon winding top (5) engaged with a reel (16-1) of the cassette (16) is small. The biasing force of a clutch spring (7) which is compressed depending on the quantity of lowering of the ribbon winding top (5) is small, the force of a winding driver gear (6) which presses a clutch plate (4-1) through a felt member (12) is small, the frictional force of the felt member (12) is small, and the torque of the rotational shaft (4) is small. This torque is just suitable for winding a long and narrow ink ribbon having a corresponding small tensile strength. When a thicker ink ribbon cassette (22) is set on the apparatus body, the quantity of lowering of the ribbon winding top (5) is large, and the biasing force of the clutch spring (7) is correspondingly large, so that the torque of the rotational shaft (4) is large in correspondence to a long wide and ink ribbon (21).

13 Claims, 8 Drawing Sheets

TAPE WINDING DEVICES

TECHNICAL FIELD

The present invention relates to a tape winding device which engages with a reel in a cassette around which a tape-like long material such as a printing tape, ink ribbon, acoustic or video recording tape, cellulose tape, or label tape with a pattern is wound by changing the winding force depending on the strength of the tape-like material.

BACKGROUND ART

Conventionally, for example, an ink ribbon winding device of a heat transfer type printer is known. Set in the printer is a ribbon cassette which contains an unused ink ribbon as a tape-like long material and a reel around which as a portion of the ink ribbon is used, the used ink ribbon portion is wound. The ink ribbon winding device engages with the reel around which the used ink ribbon is wound to transfer power from a drive source via a clutch mechanism to the winding reel. The clutch mechanism transfers drive torque by a frictional force generated by a press load of a spring to the winding reel and runs idle when the winding resistance exceeds a predetermined limit. By this arrangement, the clutch mechanism absorbs an increase in the tensile strength of the ink ribbon due to an increase in the diameter of the ink ribbon as the ink ribbon is wound and maintains the winding force of separating from printing paper the ink ribbon which adheres to the printing paper by the melting and transfer of the ink.

When the used ink ribbon portion is wound in the heat transfer type printer, resistance to separation of the ink ribbon from the printing paper varies depending on the density of the printing and the width of the ink ribbon. Thus, for example, a required slip torque of the clutch mechanism (a limit torque beyond which a slippage of the clutch mechanism occurs against the frictional force) must decrease as the width of the ink ribbon decreases and vise versa.

However, as described above, there is a probability that a drive torque with which a wider ink ribbon is wound will become insufficient because the slip torque of the clutch mechanism is constant. If the slip torque and hence the drive torque are increased to avoid such insufficient drive torque, the drive torque would be excessive for a narrower ink ribbon, so that the ink ribbon may be broken during its winding.

In order to solve this problem, before shippage of tape winding devices which include respective clutch mechanisms from a factory, a try-and-error selection method is employed which includes actually giving the winding test of the winding devices in wider and narrower ink ribbons in winding and selecting only winding devices which include respective clutch mechanisms having an appropriate slip torque. For the clutch mechanism which brought no good result of the testing, the respective components of the clutch mechanism involved in the generation of the frictional force are replaced with other appropriate ones and the resulting clutch mechanism is then actually tested again, which is very troublesome.

DISCLOSURE OF THE INVENTION

It is therefore an object of the present invention to provide a tape winding device which is capable of winding a tape-like long material in an always stabilized manner with an slip torque depending on the tensile strength of the tape-like long material.

In order to achieve the above object, the present invention provided a tape winding device provided on an apparatus body and engaged with a long tape-like material winding reel of a tape cassette set in the apparatus body for transmitting a drive force from a drive source of the apparatus body to the reel, comprising:

a rotating body having a portion which fits to the reel for rotating so as to drive the reel in a winding direction;

a rotational shaft thrust-fitting to the rotating body and having an abutting portion which abuts slidably on a frictional member;

a relay member pressed against the abutting portion and receiving the drive force from the apparatus body; and a biasing member disposed between the relay means and the rotating body for separating the relay means and the rotating body from each other and for biasing the relay member so that the relay member is pressed against the abutting portion of the rotational shaft through the frictional member.

Thus, the long tape-like material is wound in an always stabilized manner with a slip torque depending on the tensile strength of the tape-like material.

Since a winding torque depending on the tensile strength of the long tape-like material is obtained automatically, no work of selecting tape winding devices is required which include clutch mechanisms giving an appropriate slip torque after the winding devices are assembled. Thus, the number of steps of making a tape winding device and hence its cost and the corresponding working time decrease to thereby improve the working efficiency.

In order to achieve the above object, the present invention also provides a tape winding device provided on an apparatus body and engaged with a long tape-like material winding reel of a tape cassette set on the apparatus body for transmitting a drive force from a drive source of the apparatus body to the reel, comprising:

a first rotating body engaged with the reel for driving the reel in a winding direction;

a second rotating body engaged with the reel for driving the reel in a winding direction;

a first rotational shaft having a first support which thrust-fits to the first rotating body and having a first abutting portion which abuts slidably on a first frictional member;

a second rotational shaft fitted over the first rotational shaft and having a second support which thrust-fits to the second rotating body and having a second abutting portion which abuts slides on second frictional member;

a relay member pressed against the first abutting portion through the first frictional member and pressed against the second abutting portion through the second frictional member for transmitting the drive force from the drive source of the apparatus body to the first and second rotational shafts; and a biasing member disposed between the relay means and said second rotating body for separating the relay means and the second rotating body from each other and for biasing the relay member against the first and second abutting portions through first and second frictional members.

Thus, the drive torque of the tape cassette reel is changed depending on the width or tensile strength of the long tape-like material, so that an appropriate winding torque depending on the width or tensile strength of the tape-like material is applied to the tape-like material.

Bad winding of a wider long tape-like material due to an insufficient torque which is apt to occur when such wider tape-like material is used or breakage of a narrower tape-like material due to an excessive torque which is apt to occur when the narrower tape-like material is used is avoided to provide a stabilized winding of the tape-like material irrespective of its width.

BEST MODE FOR CARRYING OUT TEE INVENTION

Embodiments of the tape winding devices of the present invention will be described as ink ribbon winding devices and hence the long tape-like materials used in the tape winding devices as an ink ribbon although the present invention is not restricted to them.

[First Embodiment ]

Figure 1:
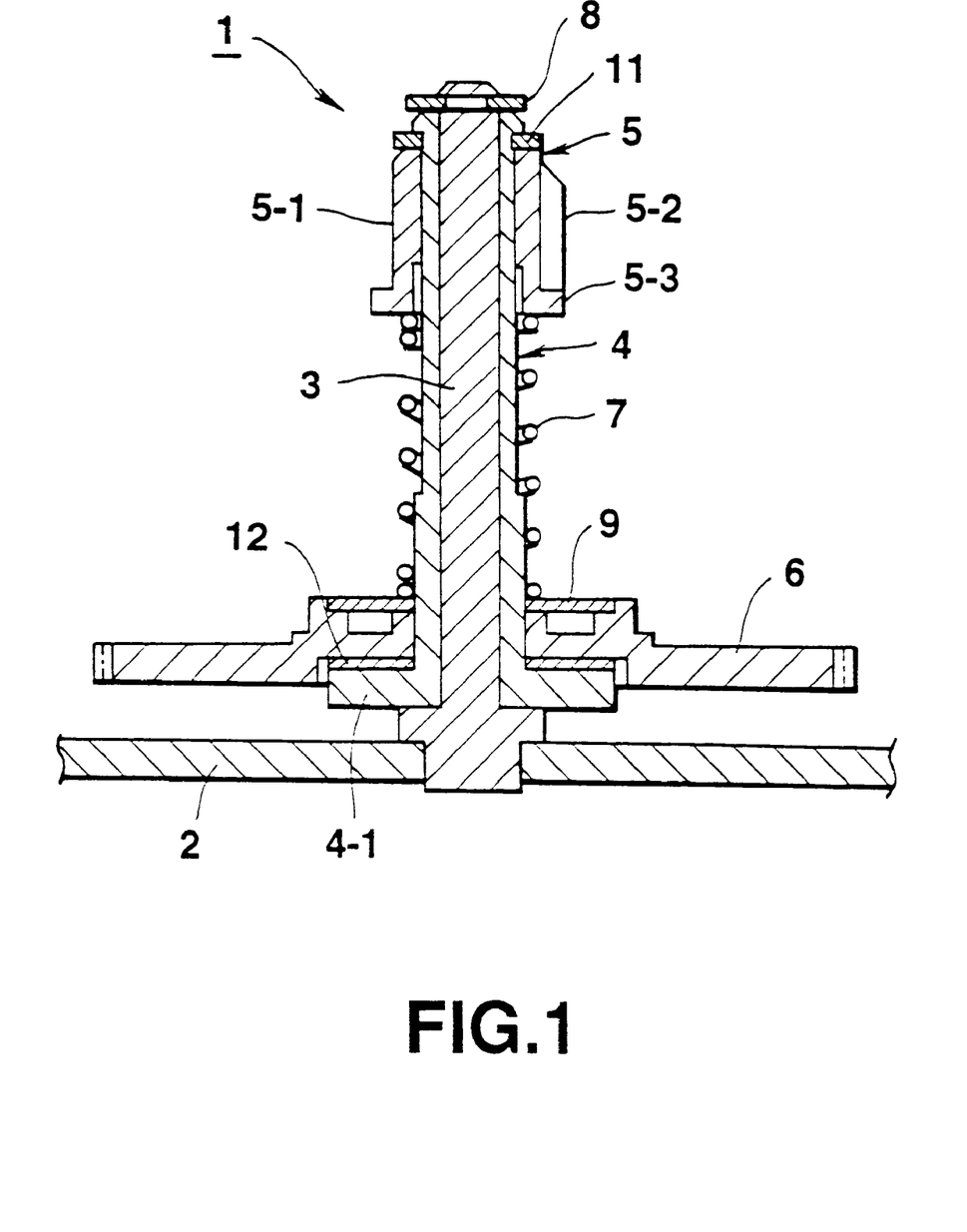
FIG. 1 is a side cross-sectional view of a tape winding device as a first embodiment of the present invention.

FIG. 1 is a side cross-sectional view of a tape winding device as a first embodiment of the present invention. As shown in FIG. 1, the tape winding device 1 is provided with a support shaft 3 fixed to a chassis 2 of a body of an apparatus such as a printer, a hollow rotational shaft 4 fitting over the support shaft 3, a ribbon winding top 5 (rotating body) fitting over the upper portion of the rotational shaft 4, a winding drive gear 6 (relay member) fitting over a lower end of the rotational shaft 4, and a helical clutch spring 7 (biasing member) disposed around the rotational shaft 4 between the winding drive gear 6 and the ribbon winding top 5.

The ribbon winding top 5 is provided with a hollow shank 5-1 fitted over the upper portion of the rotational shaft 4, a plurality of reel engaging fins (usually, 3–6 fins) provided at equal intervals around the outer periphery of the shank 5-1, and a flange 5-3 integral with a lower end of the shank 5-1. A raised boss (not shown) provided on the inner periphery of the hollow shank 5-1 is engaged slidably in an axial groove provided on the outer surface of the rotational shaft 4.

Thus, the rotational shaft 4 allows the ribbon winding top 5 to slide axially and to rotate along with the ribbon winding top 5 (thrust-fit). In a free state in which the rotational shaft 4 is not engaged with a ribbon cassette), the rotational shaft 4 supports the ribbon winding top 5 on the upper end portion of the rotational shaft 4. A disk-like clutch plate 4-1 is provided integral with the lower end of the rotational shaft 4. A C-like washer 8 is engaged in a groove on the top of the support shaft 4 to prevent the rotational shaft 4 from slipping off from the support shaft 3 so that the rotational shaft 4 is supported rotatable by the support shaft 3.

The clutch spring 7 has a pushing force which pushes the ribbon winding top 5 upward while pushing the winding drive gear 6 through a washer 9 downward. That is, the clutch spring 7 biases the ribbon winding top 5 and the winding drive gear 6 so that they are spaced from each other. In the ribbon winding top 5, the upper end of its shank 5-1 abuts on the C-like washer 11 engaged with the upper end of the rotational shaft 4 to prevent the ribbon winding top 5 from slipping off upward from the rotational shaft 4, and the ribbon winding top 5 resists the pushing force of the clutch spring 7. The winding drive gear 6 pushes the clutch plate 4-1 through a felt 12 with a force corresponding to the biasing force of the clutch spring 7. Although not shown especially, the winding drive gear 6 meshes with a drive gear (not shown) of the apparatus body to receive a rotational torque from the drive gear.

The height of the clutch spring 7 changes as the height (a lower end of the position) of the lower end of the ribbon winding top 5 (flange 5-3) changes. As shown in FIG. 1, when the ribbon winding top 5 is at the upper end of the rotational shaft 4, a quantity of shrinkage of the clutch spring 7 is minimum, and hence the force of the winding drive gear 6 to push the clutch plate 4-1 through the felt 12 is minimum. As the ribbon winding top 5 lowers, a quantity of shrinkage of the clutch spring 7 and its repulsive or biasing force increase. Thus, the force of the winding drive gear 6 to push the clutch plate 4-1 through the felt 12 increases. Thus, the frictional force of the felt 12 increases and hence the winding torque applied to the rotational shaft 4 from the winding drive gear 6 via the felt 12 and the clutch plate 4-1 increases.

Figure 2:
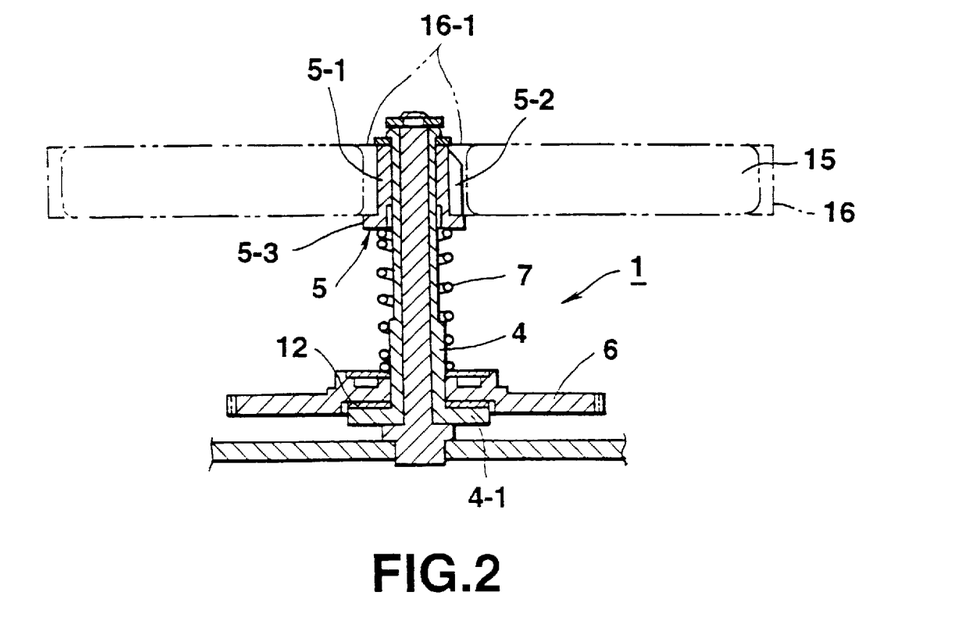
FIG. 2 is a side cross-sectional view of the tape winding device of FIG. 1 with a ribbon cassette set on the winding device.
Figure 3:
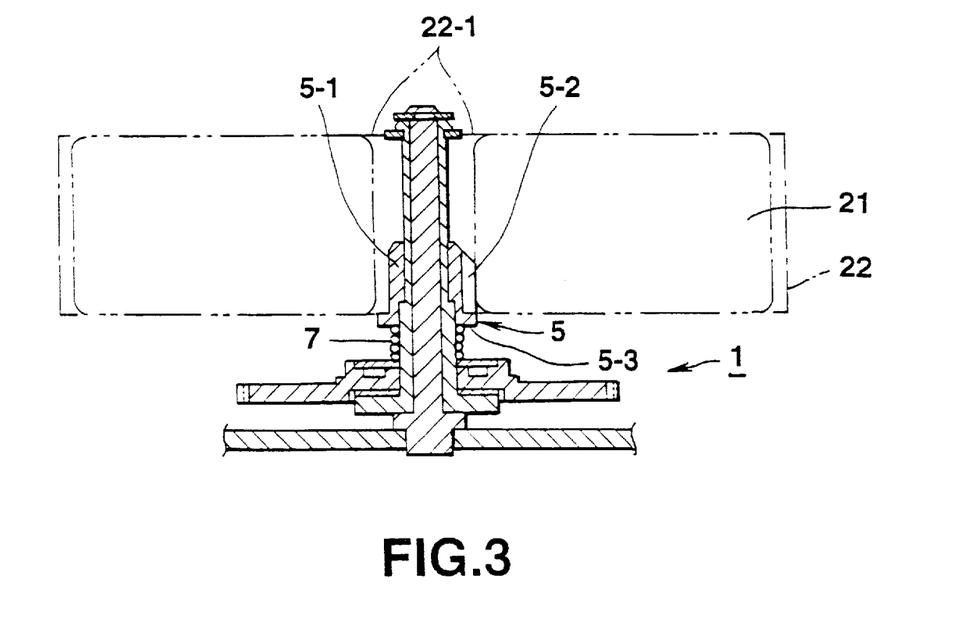
FIG. 3 is a side cross-sectional view of the tape winding device of FIG. 1 with another ribbon cassette set on the winding device.

FIGS. 2 and 3 illustrate the operation of the tape winding device 1. FIG. 2 shows the tape winding device 1 and a ribbon cassette 16 which winds therearound a narrower ink ribbon 15 fitted over the tape winding device 1. As shown in FIG. 2, the hollow shank 5-1 of the ribbon winding top 5 of the tape winding device is fitted into a center hole in a reel 16-1 of the ribbon 5 cassette 16 and engaged at its engaging fins 5-2 with corresponding engaging fins (not shown) provided on the inner surface of the hollow reel 16-1.

When the ribbon cassette 16 is set in the ribbon winding device body 1, the ribbon cassette reel 16-1 abuts at its lower end on the flange 5-3 of the ribbon winding top 5 so that the clutch spring 7 disposed between the ribbon winding top 5 and the winding drive gear 6 is compressed by the weight of the ribbon cassette 16 to thereby lower the ribbon winding top 5 and hence produce a repulsive or biasing force of the clutch spring 7. The biasing force of the clutch spring 7 is set at a force corresponding to the weight of the ribbon cassette 16.

In the case of FIG. 2, the thickness of the ribbon cassette 16, the width of the ink ribbon, and the weight of the ribbon cassette 16 are small, so that the lowering quantity of the ribbon winding top 5 is small. Thus, the set biasing force of the clutch spring 7 is small. Therefore, the force of the winding drive gear 6 25 to push the clutch plate 4-1 through the felt 12 is small, the frictional force of the felt 12 is small, and the drive torque of the rotational shaft 4 is small. The ink ribbon 15 contained in the thinner ribbon cassette 16 is low in tensile strength in correspondence to its narrow width, and the drive torque of the rotational shaft 4 set at the small value is suitable for winding the ink ribbon having the small tensile strength.

FIG. 3 illustrates a ribbon cassette 22 which contains a wider ink ribbon 21 fitted over the tape winding device 1. In this case, also in FIG. 3 as in FIG. 2, the ribbon winding top shank 5-1 of the tape winding device 1 is fitted and engaged in the center hole in a reel 22-1 of the ribbon cassette 22. When the ribbon cassette 22 is fitted over the winding device 1, its reel 22-1 abuts at its lower end on the ribbon winding top flange 5-3, and the clutch spring 7 disposed between the ribbon winding top 5 and the winding drive gear 6 is compressed by the weight of the ribbon cassette 22. Thus, the ribbon winding top 5 lowers to produce a repulsive or biasing force of the clutch spring 7. That is, the biasing force of the clutch spring 7 is set at a force corresponding to the weight of the ribbon cassette.

In FIG. 3, the width of the ink ribbon in the ribbon cassette, thickness and weight of the ribbon cassette 22 are larger than those of the ribbon cassette 16 of FIG. 2. Thus, the lowering quantity of the ribbon winding top 5 is larger. Thus, the biasing force of the clutching spring 7 and the drive torque of the rotational shaft 4 are larger.

As just described above, the drive torque of the tape winding device reel changes depending on the weight of the ribbon cassette 16 (or 22). If the weight of the ribbon cassette is smaller, the drive torque is smaller whereas if the weight of the ribbon cassette is larger, the drive torque is larger. Thus, the reel is driven at all times at a drive torque appropriate for the tensile string of the ink ribbon.

The weight of the ribbon cassette is not necessarily proportional directly to the width of the ink ribbon in the cassette or the thickness of the ribbon cassette. For example, if the thickness of the base film of the ink ribbon (not shown) is increased and an ink is coated on this base film even when the width of the ink ribbon in the cassette and the thickness of the ribbon cassette are decreased, the weight of the ribbon cassette which contains the ink ribbon increases to thereby increase the drive torque and the tensile strength. On the contrary, if the thickness of the base film of the ink ribbon (not shown) is minimized permissibly and the thickness of an ink coated on the base film is minimized permissibly even when the width of the ink ribbon in the cassette and the thickness of the ribbon cassette are increased, the weight of the ribbon cassette which contains the ink ribbon is decreased to thereby decrease the drive torque and the tensile strength of the ink ribbon. In addition, by adjusting the length of the ribbon contained in the ribbon cassette and hence the weight of the ribbon cassette, the magnitude of the drive torque and the tensile strength of the ink ribbon are adjusted. In addition, for example, by changing the weight of a mass provided in the ribbon cassette and hence the weight of the ribbon cassette, the drive torque and the tensile strength of the ink ribbon may be adjusted.

[Second Embodiment]

Figure 4:
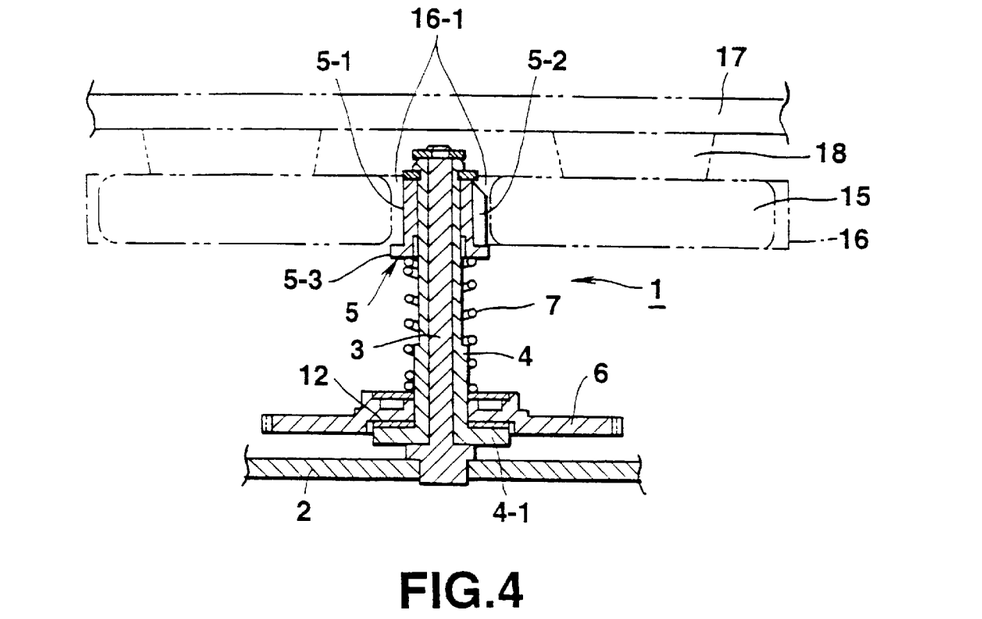
FIG. 4 is a side cross-sectional view of a tape winding device as a second embodiment of the present invention with a ribbon cassette set on the winding device.
Figure 5:
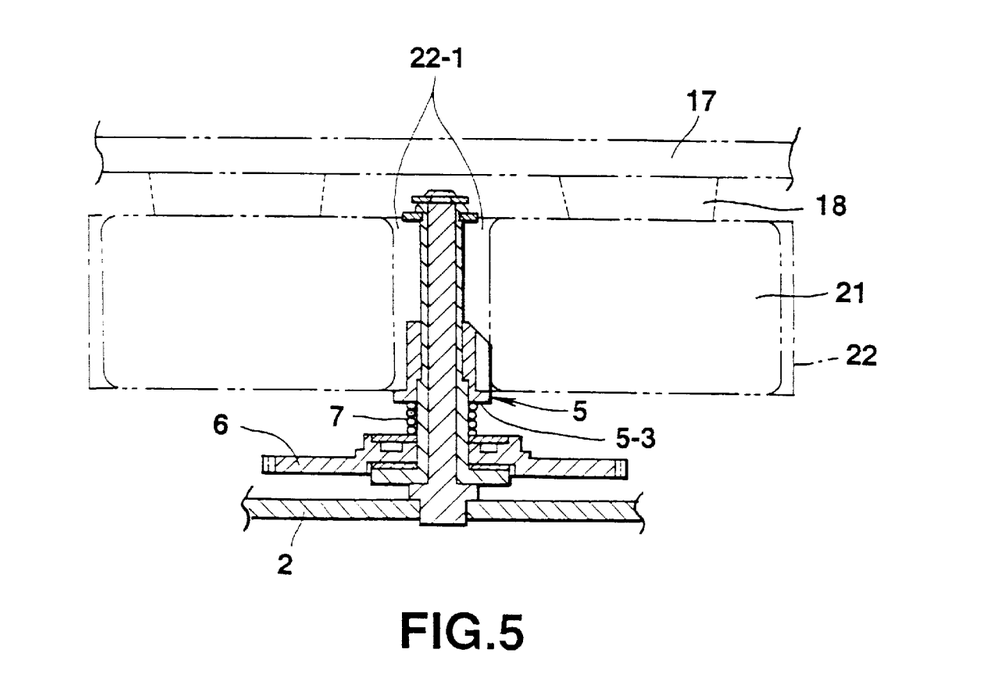
FIG. 5 is a side cross-sectional view of the tape winding device as the second embodiment with another ribbon cassette set on the winding device.

FIGS. 4 and 5 show a second embodiment of the tape winding device according to the present invention. The same reference numeral is used to identify like components of the embodiments of FIGS. 4, 5 and FIGS. 1–3 and further description thereof will be omitted.

While in the first embodiment the drive torque of the tape winding device reel is adjusted by the weight of the ribbon cassette, as shown in FIGS. 2 and 3, the present invention is not limited to this particular case. For example, by pushing the ribbon cassette 16 or 22 downward with a cover 17 attached to the apparatus device body, as shown in FIG. 4 or 5, without relying upon the weight of the ribbon cassette, a quantity of the ribbon winding top 5 lowered in fitting relationship to the ribbon cassette reel is adjusted to thereby set a quantity of compression of the clutch spring 7 disposed between the ribbon winding top 5 and the winding drive gear 6 to thereby change the biasing force of the clutch spring 7 to obtain a winding torque depending on the tensile strength of the ink ribbon.

FIGS. 4 and 5 illustrate the operation of the tape winding device 1 of the second embodiment. FIG. 4 shows a ribbon cassette 16, which winds a narrower ink ribbon 15, set on the tape winding device 1. As shown in FIG. 4, the shank 5-1 of the ribbon winding top 5 of the tape winding device 1 is inserted in a center hole in the ribbon cassette reel 16-1 and engaged at the engaging fins 5-2 with corresponding engaging fins (not shown) provided on the inner surface of the hollow reel 16-1. The vertical-direction position of the ribbon cassette 16 is fixed by a position restricting member 18 provided integral with the back of the cover 17 for the apparatus body closed after the ribbon cassette 16 is set. At this time, the cover 17 is locked to the apparatus body in a closed state by a lock member (not shown) of the apparatus body. The ribbon cassette reel 16-1 abuts at its lower end on the flange 5-3 of the ribbon winding top 5 to restrict a rise of the ribbon winding top 5.

Thus, the length of the clutch spring 7 dispose between the ribbon winding top 5 and the winding drive gear 6 is set at a length corresponding to the thickness of the ribbon cassette 16. That is, the biasing force of the clutch spring 7 is set at a force corresponding to the thickness of the ribbon cassette 16.

In the case of FIG. 4, the thickness of the ribbon cassette 16 is smaller in correspondence to the thinner width of the ink ribbon 15 to be wound, so that the lowering quantity of the ribbon winding top 5 is smaller and the set biasing force of the clutch spring 7 is smaller. In this case, the force of the winding drive gear 6 to push the clutch plate 4-1 via the felt 12 is smaller, which reduces the frictional force of the felt 12 and hence the drive torque of the rotational shaft 4.

The ink ribbon 15 wound by the thinner cassette 16 is narrower, so that its tensile strength is smaller, the drive torque of the rotational shaft 4 set at the smaller value is suitable for winding the ink ribbon having the smaller tensile strength.

FIG. 5 shows a ribbon cassette 22 which winds a wider ink ribbon 21 being set on the tape winding device 1. Also in this case, as shown in FIG. 5, the shank 5-1 of the ribbon winding top 5 is fitted in a center hole in the ribbon cassette reel 22-1 and engaged with the reel 2-1. In this case, the reel 22-1 has a larger length than the reel 16-1 of FIG. 4 because the reel length changes depending on the width of a ink ribbon to be sought. Also in FIG. 5, the ribbon cassette 22 is pushed downward by the position restricting member 18 provided on the back of the cover 17 for the apparatus so that the vertical-direction position of the ribbon cassette 22 is fixed relative to the apparatus body. The ribbon cassette reel 22-1 abuts at its lower end on the flange 5-3 of the ribbon winding top 5 to lower the ribbon winding top 5 to fix thereby its position.

Thus, the length of the clutch spring 7 between the ribbon winding top 5 and the winding drive gear 6 is compressed in correspondence to the thicker ribbon cassette 22 to be set at a corresponding length. In the case of FIG. 5, since the thickness of the ribbon cassette 22 is larger in correspondence to the larger width of the ink ribbon 21 to be wound, the lowering quantity of the ribbon winding top 5, hence the set biasing force of the clutch spring 7 and the drive torque of the rotational shaft 4 are larger.

As described above, the reel drive torque of the tape winding device 1 changes depending on the width of the ink ribbon to be wound. That is, if the width of the ink ribbon is smaller, the drive torque is smaller. On the contrary, if the width of the ink ribbon is wider, the drive torque is larger. Thus, the reel is always driven at a drive torque appropriate for the tensile strength of the ink ribbon.

The tensile strength of the ink ribbon is not necessarily proportional to its width. For example, if as many prints as possible are desired with a roll of ink ribbon, the base film of the ink ribbon and a quantity of ink to be coated on the base film are required to be minimized. By doing so, the volume of the ink ribbon is reduced. Thus, even a ribbon cassette of the same size can contain a longer ink ribbon. As the ink ribbon becomes longer, a quantity of print increases. However, a decrease in the thickness of the ink ribbon reduces its tensile strength.

Figure 6:
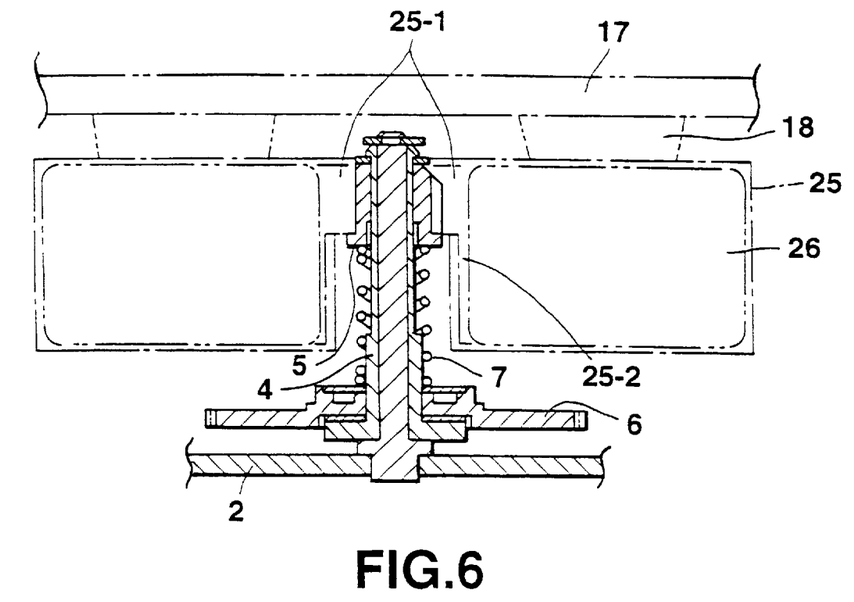
FIG. 6 is a side cross-sectional view of the tape winding device as a modification of the second embodiment with a ribbon cassette set on the winding device.

FIG. 6 shows a modification of the second embodiment which includes a ribbon cassette having a wider thinner ink ribbon having a smaller tensile strength engaged on the tape winding device 1. The ribbon cassette 25 of FIG. 6 is provided with a reel 25-1 around which a wider thinner ink ribbon 26 is wound.

The reel 25-1 has a hollow shank 25-2 around which the ink ribbon 26 is wound. The hollow shank 25-2 is longer in correspondence to the wider ink ribbon 26. The hollow reel shank 25-2 has an upper shorter engaging hole portion which engages with the ribbon winding top 5 and a lower enlarged hole portion which communicates with the upper engaging hole portion. Thus, the ribbon winding top 5 is up on the rotational shaft 4 in correspondence to the upper shorter engaging hole portion to thereby reduce a quantity of compression of the clutch spring 7 correspondingly. Thus, the drive torque of the rotational shaft 4 is reduced correspondingly to be suitable for winding the ink ribbon 26 having the larger width and lower tensile strength.

When a tape cassette is set in the apparatus body, tape cassettes having the same thickness irrespective of the widths of the ink ribbons contained in the tape cassettes are sometimes convenient to handle. With such a tape cassette 27, for example, an arrangement may be obtained in which the tape cassette is held in a position restricting member provided on the back of an open cover 17, and then the cover 17 is closed against the apparatus body to thereby cause the tape cassette to engage with the ribbon winding top 5 automatically.

Figure 7:
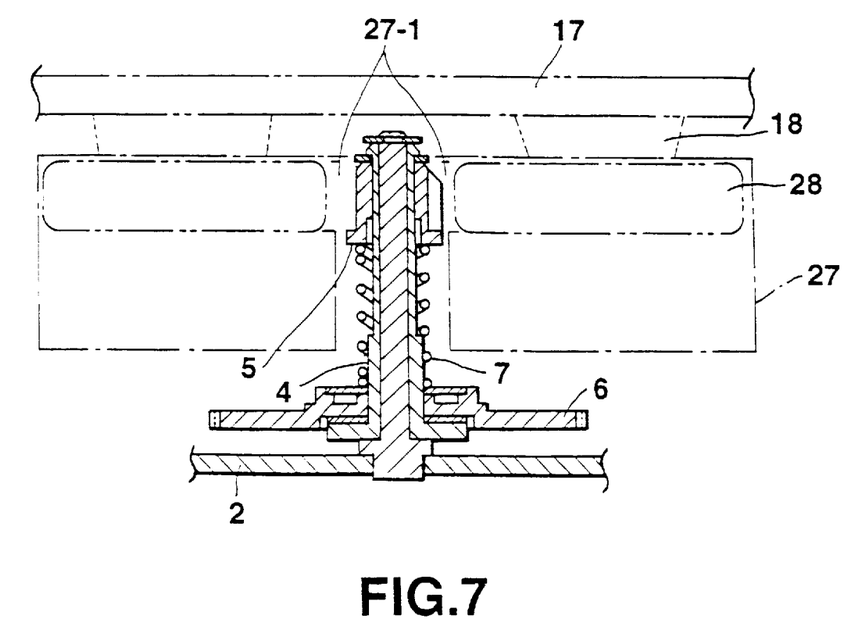
FIG. 7 is a side cross-sectional view of the tape winding device as another modification of the second embodiment with a ribbon cassette set on the winding device.

FIG. 7 shows a modification of the second embodiment which includes a tape winding device 1 engaged with a ribbon cassette having a maximum thickness and containing a narrower ink ribbon. The ribbon cassette 27 of FIG. 7 has a maximum fixed thickness irrespective of the width of the ink ribbon 28. The reel 27-1 around which the ink ribbon 28 is wound has an upper smaller engaging hole portion of reduced axial length in correspondence to a narrower width of the ink ribbon and a longer enlarged center hole portion which communicates with the upper engaging hole portion. Thus, the ribbon winding top 5 is engaged in the center engaging hole portion in the reel 27-1 at an upper position within the cassette depending on the width of the ink ribbon 28 contained in the cassette irrespective of the larger thickness of the ribbon cassette 27. A quantity of compression of the clutch spring 7 is reduced in correspondence to a quantity of upward movement of the ribbon winding top 5. Thus, the drive torque of the rotational shaft 4 is smaller, so that it is suitable for winding the ink ribbon 28 having the narrower width or the reduced tensile strength contained in the tape cassette 27 having the larger thickness.

While in the embodiments of FIGS. 4–7 the winding top is illustrated as moving vertically depending on the width of the ribbon (or the thickness of the ribbon cassette), an arrangement may be such that the vertical-direction position of the winding top is fixed and an appropriate plate is disposed movably between the winding top and the helical spring in a manner in which a lower surface of the ribbon cassette abuts on the plate.

While in the second embodiment the vertical-direction position of the ribbon cassette 16 or 22 is fixed by the position restricting member 18 integral with the back of the cover 17 of the apparatus body after the ribbon cassette 16 or 22 is set in the apparatus body, the present invention is not limited to this particular case. For example, the position restricting member 18 may be attached to the back of the cover 17. Alternatively, the cover 17 may restrict the position of the ribbon cassette 16 without providing the position restricting member 18 especially. Alternatively, the position restricting member 18 may be provided on the apparatus device body and not on the cover 17, so that the position restricting member 18 lowers the ribbon cassette 16 set in the apparatus body and fixes the vertical-direction position of the cassette 16.

While in the first and second embodiments the winding drive gear 6 is illustrated as being fitted over the rotational shaft 4, the present invention is not limited to this particular case. For example, the winding drive gear 6 may be rotatably attached within the apparatus body excluding on the rotational shaft 4 so that a drive torque from a drive system (not shown) of the apparatus body may be transmitted to the winding drive gear 6. While the clutch plate 4-1 is illustrated as taking the form of a disk integral with the support of the rotational shaft 4, it may take another shape.

[Third Embodiment]

Figure 8:
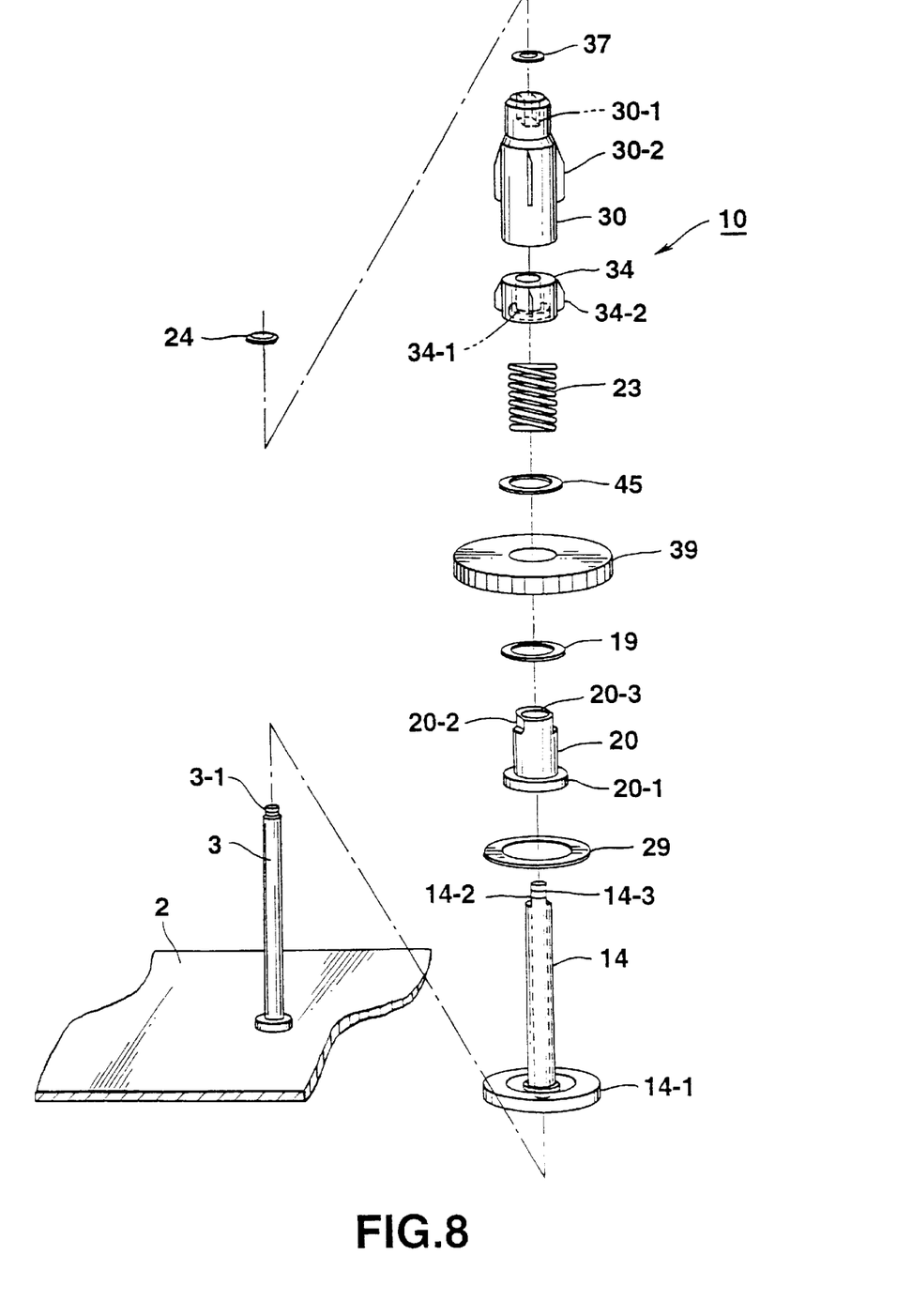
FIG. 8 is an exploded perspective view of a tape winding device as a third embodiment of the present invention.
Figure 9:
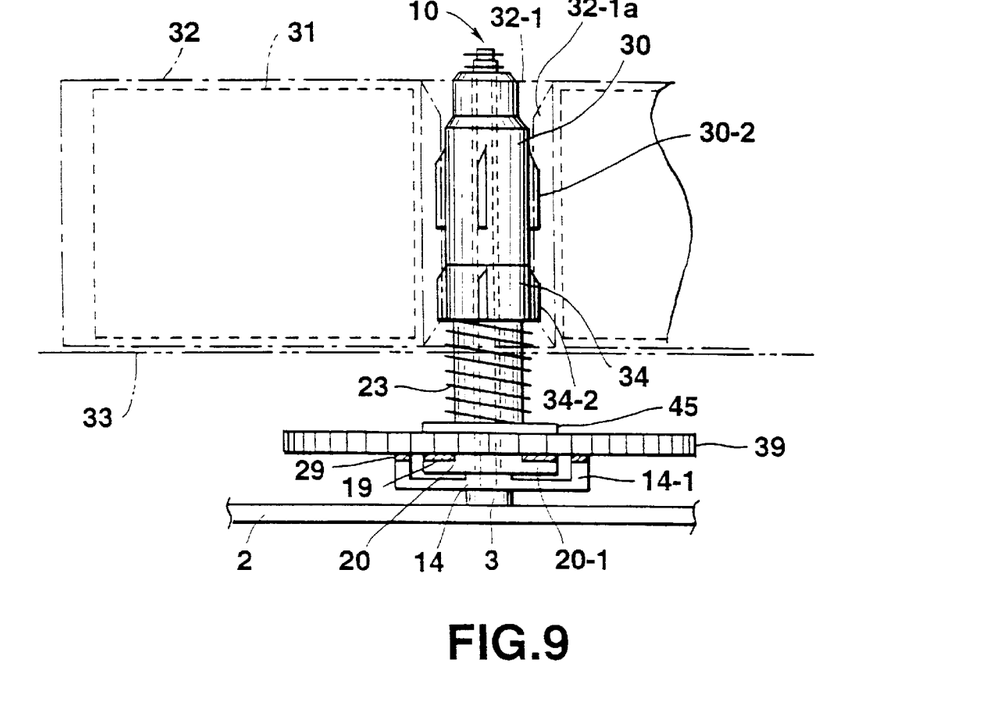
FIG. 9 is a side view of the tape winding device of FIG. 8 with a ribbon cassette set on the winding device.
Figure 10:
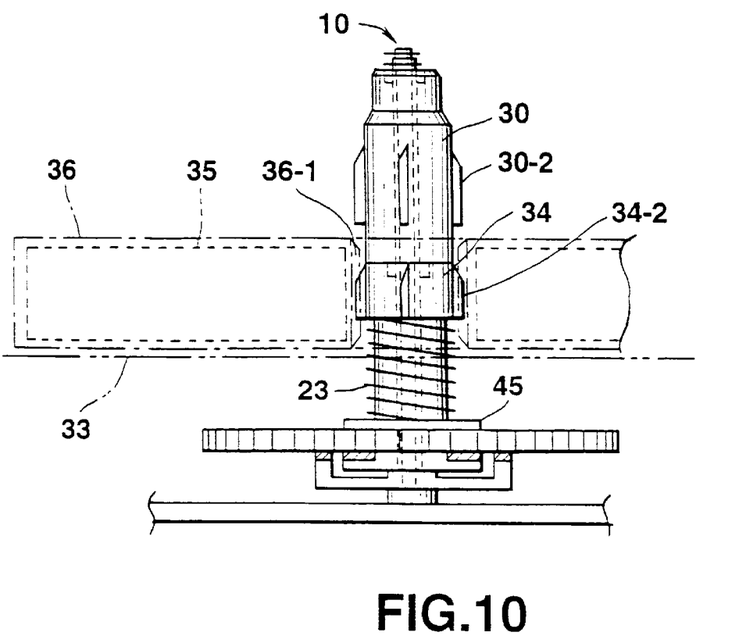
FIG. 10 is a side view of the tape winding device of FIG. 8 with another ribbon cassette set on the winding device.

FIG. 8 is an exposed perspective view of a tape winding device as a third embodiment of the present invention. FIGS. 9 and 10 each illustrate the operation of the assembled tape winding device set on the apparatus body where a cassette which contain a ink ribbon is set. The same reference numeral is used to denote similar components of the tape winding devices of FIGS. 8 and 9 and FIGS. 1–7, and their further description will be omitted.

In the present embodiment, the tape cassette is, for example, a ribbon cassette 32 which contains the ink ribbon 31 and a winding reel 32-1; a first rotational body is, for example, a longer winding top 30; a first support is, for example, an upper end portion 14-2 of the longer rotational shaft 14, a first abutting member is, for example, a driven wheel 14-1; a first rotational shaft is, for example, the longer rotational shaft 14; a second rotational body is, for example, a shorter winding top 34; a second support is, for example, an upper end portion 20-2 of a shorter rotational shaft 20; a second abutting member is, for example, a driven wheel 20-1; a second rotational shaft is, for example, the shorter hollow rotational shaft 20; a first frictional member is, for example, a larger ring-like felt 29; a second frictional member is, for example, a smaller ring-like felt 19; a relay member is, for example, a winding drive gear 39; and a biasing member is, for example, a helical spring 23.

First, the structure of the tape winding device of the third embodiment will be described. As shown in FIGS. 8 and 9, the tape winding device 10 is provided with a support shaft 3 fixed to a chassis 2 of the apparatus (for example, printer) body, the long rotational shaft 14 fitted rotationally over the support shaft 3 and having the integral driven wheel 14-1 at a lower end thereof, a lower winding top 30 fitted over the upper end portion of the rotational shaft 14, the shorter rotational shaft 20 fitted over the longer rotational shaft 14 and having a through hole 20-3 and the integral driven wheel 20-1 smaller than the driven wheel 14-1, the shorter winding top 34 fitted over the top of the shorter rotational shaft 20, a winding drive gear 39 fitted over the shorter rotational shaft 20 and pressed against the driven wheel 14-1 through the larger ring-like felt 29 and pressed against the driven wheel 20-1 through the smaller ring-like felt 19, and the helical spring 23 fitted over the shorter rotational shaft 20 and pressed at a lower end thereof against the winding drive gear 39 through a slip washer 45 to reduce friction and pressed at its upper end against the lower end of the shorter winding top 34.

Grease (not shown) as a lubricant is provided between the longer and smaller winding tops 30 and 34 to reduce possible friction produced between those winding tops.

The support shaft 3 has a groove 3-1 provided along the periphery of the upper end portion thereof. The support shaft 3 prevents the longer rotational shaft 14 from slipping off from the support shaft 3 by a C-like washer 24 fitted in the groove 3-1 to thereby support the rotational shaft 14 rotatably.

The longer rotational shaft 14 has an upper end 14-2 of a non-circular cross section. It extends through the longer winding top 30, fits at its upper end axially slidably in an engaging hollow 30-1 provided on an upper end of the winding top 30 (thrust-fit), and is rotatable along with the longer winding top 30. A C-like washer 37 is fitted in a groove 14-3 provided on the side of the upper shaft end 14-2 to prevent the longer winding top 30 from slipping off from the longer rotational shaft 14. A plurality of vertical engaging fins 30-2 provided on the outer surface of the shank of the longer winding top 30 engage with corresponding engaging fins 32-1a provided on the inner surface of the center hole in the ribbon cassette reel 32-1.

The upper end portion 20-2 of the shorter rotational shaft 20 has a non-circular cross-section, fits axially slidably into a hollow 34-1 provided in a lower end of the shorter winding top 34 (thrust-fit), and is rotatable along with the shorter winding top 34. The shorter winding top 34 has a plurality of vertical engaging fins 34-2 equally spaced around the outer periphery thereof which are engaged with a corresponding plurality of engaging fins (not shown) provided on inner surface of the hollow reel of the ribbon cassette.

Since the longer winding top 30 is prevented from slipping upwards from the longer shaft 14 by the C-like washer 37, the shorter rotational shaft 20, the shorter winding top 34 which fits over the shaft 20, the helical spring 23 and the winding drive gear 39 are rotatably positioned between the lower end of the longer winding top 30 and the lower end of the longer rotational shaft 14.

Since the helical spring 23 is provided in a compressed state between the shorter winding top 34 and the winding drive gear 39, the helical spring 23 has a biasing force by which the winding drive gear 39 presses the driven wheels 14-1 and 20-1 through the larger and smaller ring-like felts 29 and 19 to thereby transmit the rotational drive from a drive system (not shown) of the apparatus body to the driven wheels 14-1 and 20-1.

FIG. 9 shows a thicker ribbon cassette 32 which winds a wider ink ribbon 31 set in a cassette receiving section 33 of the apparatus body and then set in the tape winding device 10.

In FIG. 9, Since the reel 32-1 has a larger length corresponding to the wider width of an ink ribbon 31 to be wound, both the longer and smaller winding tops 30 and 34 of the tape winding device 10 fit into the center hole in the ribbon cassette reel 32-1 and their axial engaging fins 30-2 and 34-2 both engage with the corresponding engaging fins 32-1a provided on the inner surface of the hollow reel 32-1.

Thus, the ribbon cassette reel 32-1 receives a larger drive torque which is the sum of the drive torques from both the longer and shorter winding tops 30 and 34. The ink ribbon 31 wound by the thicker ribbon cassette reel 32-1 has a larger tensile strength corresponding to its larger width. The rotational drive due to the larger drive torque is exactly suitable for winding the ink ribbon 31 having the larger tensile strength.

FIG. 10 shows a thinner ribbon cassette 36 which winds a narrower ink ribbon 35 positioned on the cassette setting section 33, which is then set on the tape winding device 10. In this case, since the length of the ribbon cassette reel 36-1 is smaller in correspondence to the thinner width of the ink ribbon 35 to be wound, the engaging fins 30-2 of the longer winding top 30 positioned at a higher portion in the tape winding device 10 appear above the reel 36-1 and only the engaging fins 34-2 of the shorter winding top 34 engage with the corresponding engaging fins provided on the inner surface of the hollow reel 36-1.

Thus, the reel 36-1 receives a drive torque from only the shorter winding top 34. The drive torque is therefore lower. The ink ribbon 35 wound by the thinner ribbon cassette reel 36-1 has the narrower width, so that it has a corresponding smaller tensile strength. The rotational drive due to the lower drive torque is just suitable for winding the narrower ink ribbon 35 having the smaller tensile strength.

As described above, the drive torque of the reel of the tape winding device 10 changes depending on the width of the ink ribbon to be wound. As the width of the ink ribbon is narrower, the drive torque is lower whereas as the width of the ink ribbon is wider, the drive torque is higher. Thus, the reel is always driven by a drive torque appropriate for the tensile strength of the ink ribbon.

The tensile strength of the long ink ribbon is not always proportional to its width. For example, if as many prints as possible are desired, using a roll of ink ribbon, the thickness of the base film of the ink ribbon is permissibly minimized and a layer of an ink coated on the base film is also minimized permissibly. By doing so, the tape volume decreases. Thus, even the same ribbon cassette can contain a longer ink ribbon. As the ink ribbon is longer, a quantity of print increases. However, if the ink ribbon is thinner, its tensile strength is lower.

Figure 11:
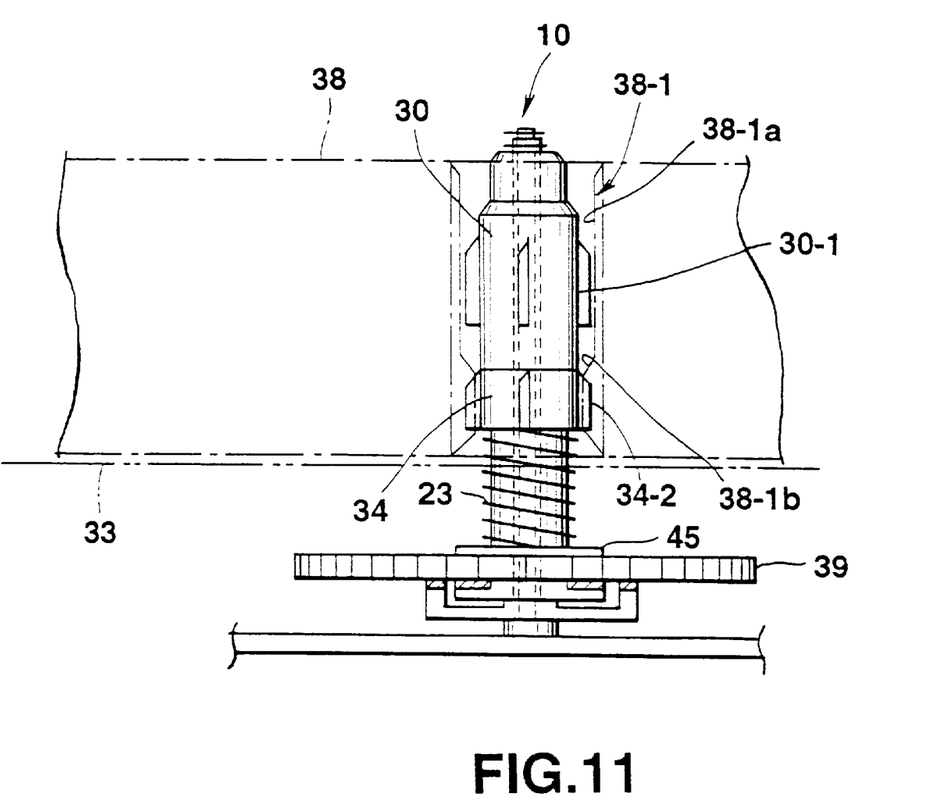
FIG. 11 is a side view of a tape winding device as a modification of the third embodiment with a ribbon cassette set on the winding device.

FIG. 11 shows a modification of the third embodiment and more particularly a tape winding device 10 and a ribbon cassette which contains a wider thinner ink ribbon (that is, a wider ribbon having a smaller tensile strength) engaged on the tape winding device 10. The ribbon cassette 38 of FIG. 11 Is provided with a reel 38-1 around which a wider thicker ink ribbon is wound. In the reel 38-1, a shank around which the ink ribbon is wound is longer in correspondence to the wider ink ribbon, and the reel has a lower engaging fins 38-1b which engage with the corresponding engaging fins 34-2 of the winding top 34.

Thus, the length of the reel 38-1 is larger in correspondence to a wider ink ribbon. Even when the longer and shorter winding tops 30 and 34 of the tape winding device 10 are both fitted into the reel 38-1, the engaging fins 30-1 of the longer winding top 30 do not engage with the reel 32-1, and only the engaging fins 34-2 of the shorter winding top 34 engage with the corresponding engaging fins 38-1b on the inner surface of the hollow reel 32-1.

Thus, also, in this case, the ribbon cassette reel 38-1 receives a drive torque from only the shorter winding top 34. The drive torque is correspondingly smaller and just suitable for winding the wider ink ribbon having a smaller tensile strength.

Figure 12:
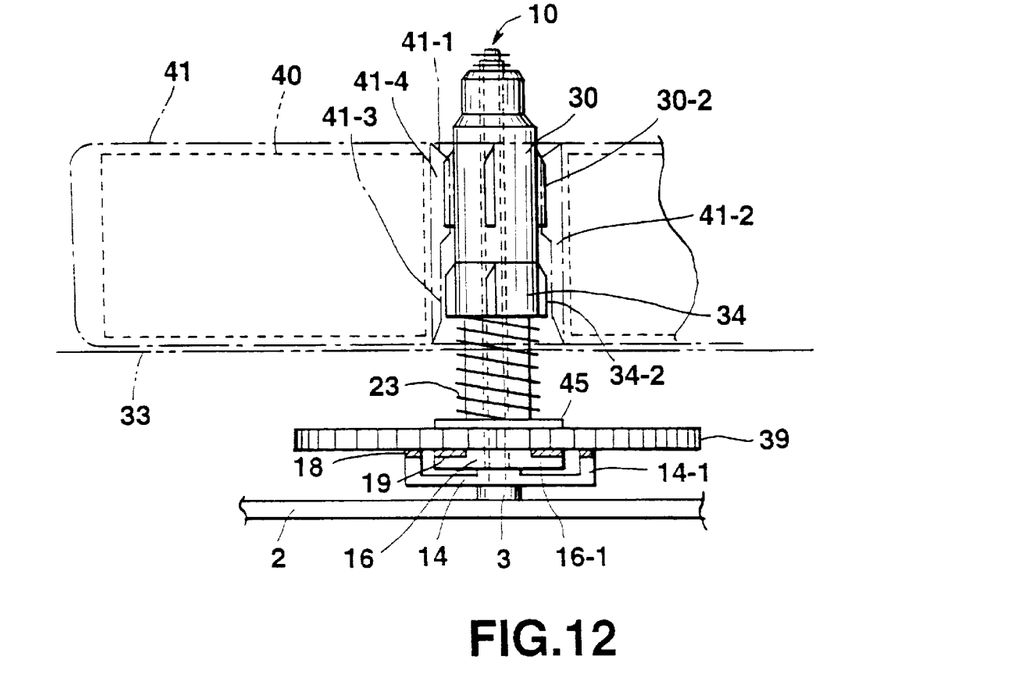
FIG. 12 is a side view of a tape winding device as another modification of the third embodiment with a ribbon cassette set on the winding device.

FIG. 12 shows a modification of the third embodiment in which the ribbon cassette reel 41-1 is engaged with the longer winding top 30 alone. With a wider thinner ink ribbon having an intermediate tensile strength) like the ribbon 40 of FIG. 12, when the ribbon cassette reel 41-1 of FIG. 12 around which such ink ribbon is wound engages with both the engaging fins 30-2 and 34-2 of the longer and shorter winding tops 30 and 34, as shown in FIG. 9, the reel 41-1 would receive drive torques from both the tops 30 and 34. The sum of both the drive torques is too strong to pull the ink ribbon 40.

On the contrary, when only the ribbon cassette reel 41-1 of FIG. 12 engages with the engaging fins 34-2 of the shorter winding top 34, as shown in FIG. 10, the reel 41-1 receives a drive torque from the shorter winding top 34. However, the drive torque is too small to pull such ink ribbon.

In order to cope with such problem, according to the arrangement of this modification, only the longer winding top 30 which provides a higher torque than the shorter winding top 34 is engaged with the reel 41-1 to transmit the torque from only the longer winding top 30 to the reel to thereby pull the ink ribbon 40 of the ribbon cassette 41.

More specifically, FIG. 12 shows the ribbon cassette 41 which contains a wider thinner ink ribbon 40 and the tape winding device 10 engaged with the ribbon cassette 41. The ribbon cassette reel 41-1 of FIG. 12 is for winding a wider thinner ink ribbon 40. The reel shank 41-2 around which the wider ink ribbon 40 is wound is longer in correspondence to the wider ink ribbon 40 and has upper engaging fins 41-4 provided on the upper inner surface of the hollow shank 41-2 and engaged with the corresponding engaging fins of the longer winding top 30.

Thus, even when the ribbon cassette 41 is set in the tape winding device 10 and the longer and shorter winding tops 30 and 34 of the tape winding device 10 are fitted into the reel 41-1, the engaging fins 34-2 of the shorter winding top 34 do not engage with the corresponding engaging fins 6 on the inner surface of the hollow reel 41-1, but only the engaging fins 30-2 of the longer winding top 30 engage with the engaging fins 41-4 of the reel 41-1. Thus, the ribbon cassette reel 41-1 receives a drive torque from only the longer winding top 30.

Accordingly, with a wider thinner ink ribbon, that is, when the reel requires a drive torque from only the longer winding top 30, application of an insufficient or 15 excessive torque to the torque is avoided, and stabilized ribbon winding is achieved.

As described above, with a thicker ribbon cassette, or a wider ink ribbon, three kinds of torques are realized by the corresponding arrangements of the reels 32-1, 38-1 of FIGS. 9, 11 and a reel engaged with a longer winding top 15 only.

Figure 13:
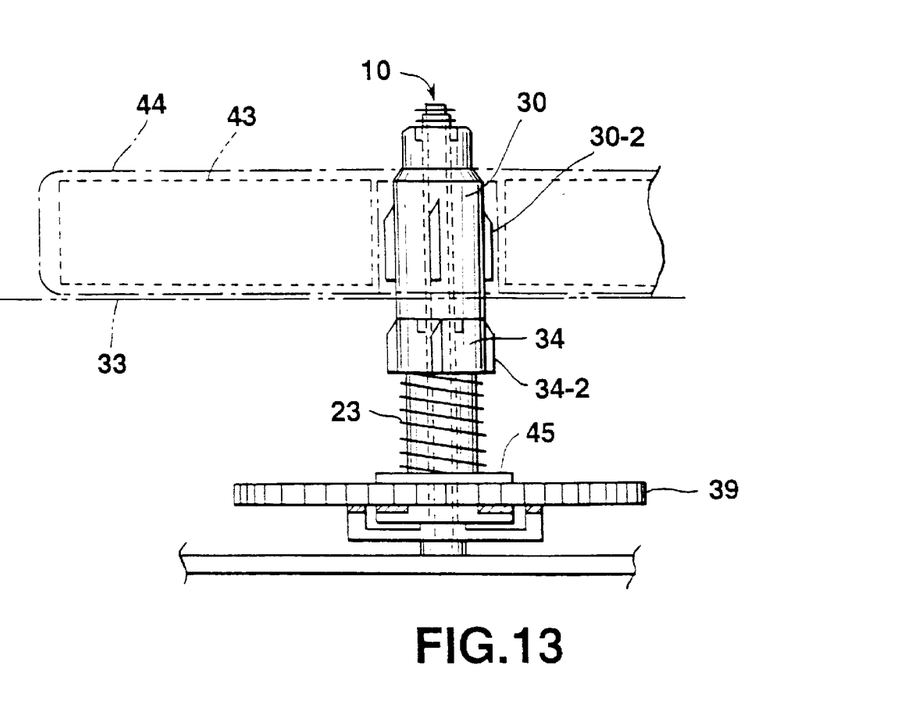
FIG. 13 is a side view of a tape winding device as a further modification of the third embodiment of the present invention with a ribbon cassette set on the winding device.

While in the modification of the third embodiment of FIG. 12 the ribbon cassette which contains a wider thinner ink ribbon is taken as an example of the cassette ribbon cassette 41 which engages with the longer winding top 30 alone, the present invention is not limited to the particular case. The present invention is applicable to ribbon cassettes which require a drive torque of the longer winding top 30 or, for example, a ribbon cassette 44 which contains a narrower thicker ink ribbon 43 as shown in FIG. 13.

In the arrangement of the third embodiment, the torque from the drive system (not shown) of the apparatus body is transmitted from the winding drive gear 39 through the larger and smaller ring-like felts 29 and 19 to the driven wheels 14-1 and 20-1, and hence to the longer and smaller winding tops 30 and 34. In this case, the smaller ring-like felt 19 gives a smaller frictional transmission force than the larger ring-like felt 29. At this time, for example, when a long narrower ink ribbon having a smaller tensile strength of a ribbon cassette is wound, the cassette reel is engaged with the shorter winding top 34 which receives a drive torque via the smaller ring-like felt 19. It is to be noted that the present invention is not limited to this particular case. For example, even with a ribbon cassette for a wider ink ribbon having a larger tensile strength, such ink ribbon cassette can be wound around its ribbon cassette by replacing the smaller ring-like felt 19 with a ink ribbon having a larger frictional transmission force and by engaging the cassette reel with the shorter winding top. On the contrary, for example, even with a ribbon cassette for a smaller ink ribbon having a smaller tensile strength, such ink ribbon can be wound around its ribbon cassette by replacing the larger ring-like felt 29 with a ink ribbon giving a smaller frictional transmission force and by engaging the cassette reel with the longer winding top 30.

While in the third embodiment the slip washer 45 is disposed between the drive gear 39 and the helical spring 23 to reduce friction which will be produced between the drive gear 39 and the helical spring 23, anything may be used instead of the slip washer 45 as long as it reduces the friction. For example, grease may be coated on the respective contacting surfaces of the drive gear 39 and the helical spring 23.

While in the third embodiment grease is coated on the respective contacting surfaces of the longer and shorter winding tops 30 and 34 as a lubricant to reduce friction which will be produced between the longer and shorter winding tops 30 and 34, anything may be used instead of the grease so long as it reduces the friction. For example, a slip washer may be used.

While in the third embodiment the compressed helical spring 23 is disposed between the shorter winding top 34 and the winding drive gear 39 so that the biasing force of the helical spring presses the winding drive gear 39 against the driven wheels 14-1 and 20-1 through the larger and smaller ring-like felts 29 and 19, the present invention is not limited to this particular case. To this end, for example, an elastic rubber member may be used instead of the helical spring 23.

We claim:

1. A tape winding device provided on an apparatus body and engaged with a long tape-like material winding reel of a tape cassette set on the apparatus body for transmitting a drive force from a drive source of the apparatus body to the reel, comprising:

a first rotating body engaged with the reel for driving the reel in a winding direction;

a second rotating body engaged with the reel for driving the reel in said winding direction;

a first rotational shaft having a first support which non-rotatably thrust-fits to said first rotating body and having a first abutting portion which abuts slidably on a first frictional member;

a second rotating shaft rotatably fitted over said first rotational shaft and having a second support which non-rotatably thrust-fits to said second rotating body and having a second abutting portion which abuts slidably on a second frictional member;

a relay member pressed against said first abutting portion through said first frictional member and pressed against said second abutting portion through said second frictional member for transmitting the drive force from the drive source of the apparatus body to said first and second rotational shafts; and a biasing member disposed between said relay member and said second rotating body for separating said relay member and said second rotating body from each other and for biasing said relay member against said first and second abutting portions through said first and second frictional members.

2. The tape winding device according to claim 1, wherein when the reel comprises a reel on which a long tape-like material having a higher tensile strength is wound, the reel is structured to engage with said first and second rotating bodies, whereas when the reel comprises a reel on which a long tape-like material having a lower tensile strength is wound, the reel is structured to engage with only one of said first and second rotating bodies.

3. The tape winding device according to claim 1, wherein when the reel comprises a reel on which a long tape-like material having a higher tensile strength is wound, the reel is structured to engage with said first rotating body, whereas when the reel comprises a reel on which a long tape-like material having a lower tensile strength is wound, the reel is structured to engage with said second rotating body.

4. The tape winding device according to claim 1, wherein when the reel comprises a reel on which a long tape-like material having a higher tensile strength is wound, the reel is structured to engage with said second rotating body, whereas when the reel comprises a reel on which a long tape-like material having a lower tensile strength is wound, the reel is structured to engage with said first rotating body.

5. The tape winding device according to claim 1, further comprising reducing means provided between said first and second rotating bodies for reducing possible friction produced between said first and second rotating bodies.

6. The tape winding device according to claim 5, wherein said reducing means comprises a lubricant.

7. The tape winding device according to claim 5, wherein said reducing means comprises a slip washer.

8. The tape winding device according to claim 1, further comprising reducing means provided between said relay member and said biasing member for reducing possible friction produced between said relay member and said biasing member.

9. The tape winding device according to claim 8, wherein said reducing means comprises a lubricant.

10. The tape winding device according to claim 8, wherein said reducing means comprises a slip washer.

11. The tape winding device according to claim 1, further comprising locking means attached to said first rotational shaft for causing said biasing member to produce a biasing force.

12. The tape winding device according to claim 1, wherein said first abutting portion comprises a flange.

13. The tape winding device according to claim 1, wherein said second abutting portion comprises a flange.

* * * * *

UNITED STATES PATENT AND TRADEMARK OFFICE
CERTIFICATE OF CORRECTION

PATENT NO. : 6,145,769
DATED : November 14, 2000
INVENTOR(S) : Yoshiaki Mochizuki It is certified that error appears in the above-identified patent and that said Letters Patent is hereby corrected as shown below:

Item [19], change "Shiraishi et al." to -- Mochizuki --;
Item [75], Inventors, line 1, delete "Yasushi Shiraishi; ", line 2, delete "both of";
Item [57], Abstract, line 1, change "is a set" to -- is set --; and line 3, delete "and".

Signed and Sealed this

Eighteenth Day of September, 2001

Attest:

*Nicholas P. Godici*

NICHOLAS P. GODICI
*Attesting Officer*     *Acting Director of the United States Patent and Trademark Office*